United States Patent [19]

Lhuillier et al.

[11] Patent Number: 5,079,631
[45] Date of Patent: Jan. 7, 1992

[54] DEVICE FOR ENCODING DIGITAL VIDEO SIGNALS INCLUDING MEANS FOR CLASSIFYING THE VIDEO SIGNALS INTO DISTINCT FAMILIES PRIOR TO NORMALIZATION AND QUANTIZATION

[75] Inventors: Jean-Jacques Lhuillier, Saint-Maur; Phillippe Guichard, Verrieres-Le-Buisson, both of France

[73] Assignee: U.S. Philips Corporation, New York, N.Y.

[21] Appl. No.: 489,127

[22] Filed: Mar. 6, 1990

[30] Foreign Application Priority Data

Mar. 24, 1989 [FR] France .................. 89 03929

[51] Int. Cl.$^5$ .................................. H04N 7/133
[52] U.S. Cl. ............................. 358/133; 358/135
[58] Field of Search ............... 358/133, 135, 136, 141, 358/105

[56] References Cited

U.S. PATENT DOCUMENTS

| | | |
|---|---|---|
| 4,394,774 | 7/1983 | Widergren . |
| 4,707,738 | 11/1987 | Ferre et al. ............... 358/135 |
| 4,780,761 | 10/1988 | Daly et al. ............... 358/133 |
| 4,920,414 | 4/1990 | Remus et al. ............ 358/133 |
| 4,933,763 | 6/1990 | Chantelou ................ 358/105 X |

Primary Examiner—Victor R. Kostak
Attorney, Agent, or Firm—Edward W. Goodman

[57] ABSTRACT

Device for encoding digital video signals which are representative of the luminance or the chrominance of a given number of pixels of a picture divided into blocks, including respective circuits for correlation reduction, normalization, quantization, encoding, and rate control, the latter receiving the output signals from the encoding circuit in accordance with a variable rate and supplying rate control signals applied to the normalization circuit and encoded signals at a constant rate at the output of the encoding device. In this device, the normalization circuit firstly includes circuits for non-linear treatment (31, 32, 33, 34, 35, 36, 37a, 37b) for receiving the blocks and the rate control signals as well as the classification indications of the blocks into distinct families in accordance with the values of different parameters determined from these blocks by a classification circuit (20) and subsequently for effecting respective distinct non-linear treatments on these blocks and these rate control signals in conformity with the families. The normalization circuit also includes normalization circuit (38, 39) for determining the normalized signals from various signals thus treated.

5 Claims, 5 Drawing Sheets

FIG.2b  FIG.2c

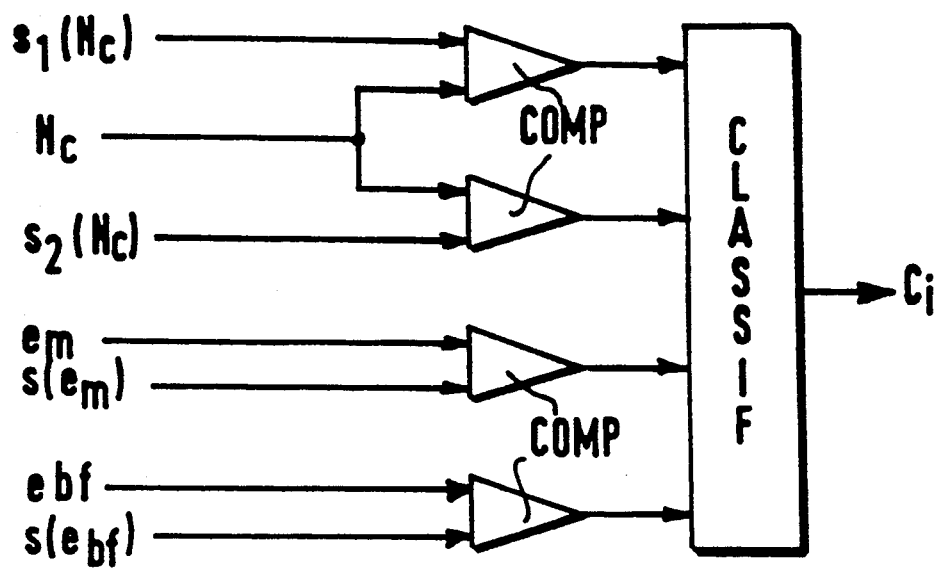
FIG.3a
FIG.3b
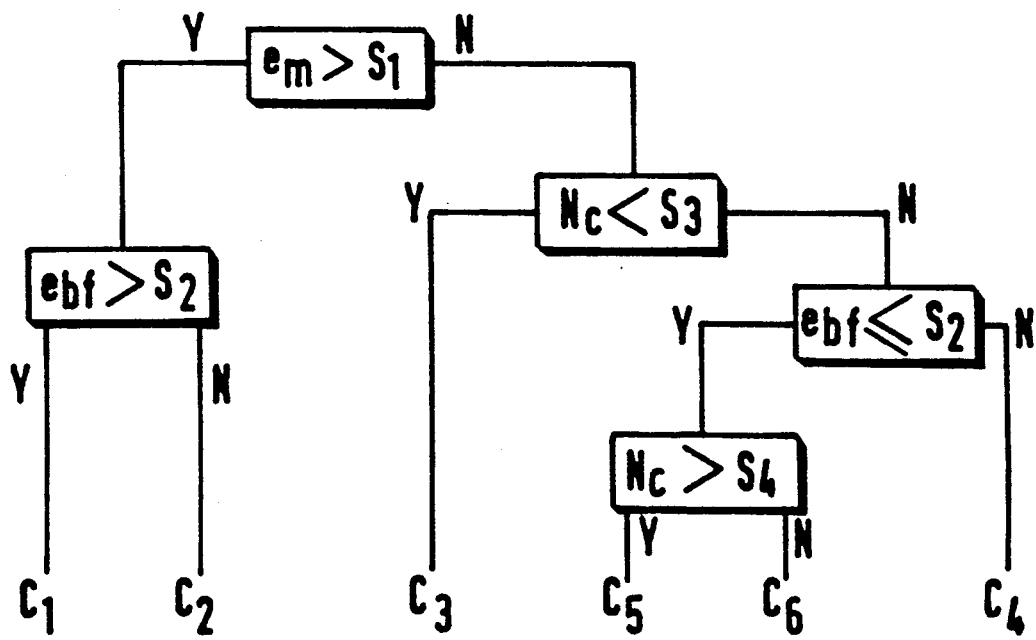

DEVICE FOR ENCODING DIGITAL VIDEO SIGNALS INCLUDING MEANS FOR CLASSIFYING THE VIDEO SIGNALS INTO DISTINCT FAMILIES PRIOR TO NORMALIZATION AND QUANTIZATION

BACKGROUND OF THE INVENTION

1. Field of the Invention

The invention relates to device for encoding digital video signals which are representative of the luminance or the chrominance of a given number of pixels of a picture divided into blocks, comprising particularly a correlation reduction circuit, a normalization circuit, a quantization circuit, an encoding circuit as well as a rate control circuit which receives the output signals from the encoding circuit at a variable rate and supplies, on the one hand, rate control signals applied to the normalization circuit and, on the other hand, encoded signals at a constant rate at the output of the encoding device.

With a view to their transmission or recording, the digitization of television signals is a solution which is extremely useful in the case of connections where the disturbing noise is particularly significant, notably in connections by way of satellite. A television image comprises a very large quantity of information components whose digital representation is expressed by a high rate. By sampling the components of the television signal at a frequency satisfying the Shannon condition and by using a uniform quantization at 256 levels, the direct digitization of the luminance and chrominance components at frequencies of 13.5 and 6.75 MHz, respectively, imposed by the standards, would contribute in effect to a rate of 216 Meb/s. This rate is quite prohibitive, notably in the case of magnetic recording devices for consumer use. The use of rate reduction techniques is thus necessary and is all the more realizable as the image exhibits a relatively considerable redundancy.

2. Description of the Related Art

A device as mentioned in the opening paragraph is described in Patent Application WO 88/04508. In this device the normalization is ensured by associating with each picture block a classification factor of this block in a particular class characterized by a specific criterion. This specific criterion is unique and is based on a classification of blocks in accordance with the largest or smallest number of details which they comprise in accordance with one or the other of the spatial dimensions of the picture. The encoding is subsequently adjusted as a function of the classification thus performed.

SUMMARY OF THE INVENTION

It is the object of the invention to provide a device for encoding pictures in accordance with several quantitative criteria, i.e. by taking into account several parameters which are distinctly associated with signals which are representative of the pictures, and thus to realize a classification of picture blocks into distinct families in accordance with these parameter values.

Such a classification is clearly more precise than that mentioned above. The most current faults in the picture due to encoding, such as blocking effects, occurrence of parasitic base functions, deformation of contours, are connected with the nature of the picture blocks. By performing a discrimination among these blocks, it will be possible to treat the faults individually by modifying the block encoding parameters in a specific way in families which are specific of each one of these faults.

To this end, the invention relates to a device which is characterized in that said normalization circuit comprises:

(A) means for non-linear treatment for receiving said blocks of signals and said rate control signals, on the one hand, and, on the other hand, indications of the classification of said blocks into distinct families in accordance with the values of different parameters determined from these blocks by a classification circuit and for effecting respective distinct non-linear treatments on said blocks of signals and said rate control signals in conformity with said families;

(B) normalization means for determining the normalized signals from various signals thus treated.

With the structure thus proposed, it is effectively possible to treat a large number of picture faults by determining for each picture block distinct parameters which are connected respectively or principally with these faults.

BRIEF DESCRIPTION OF THE DRAWINGS

The invention will now be described in greater detail by way of example with reference to the accompanying drawings, in which:

FIG. 2b shows the bidimensional matrix of the transform coefficients of one of these picture blocks, FIG. 2c shows a type of monodimensional path for reading and treating these coefficients.

DESCRIPTION OF THE PREFERRED EMBODIMENT

Figure 1:
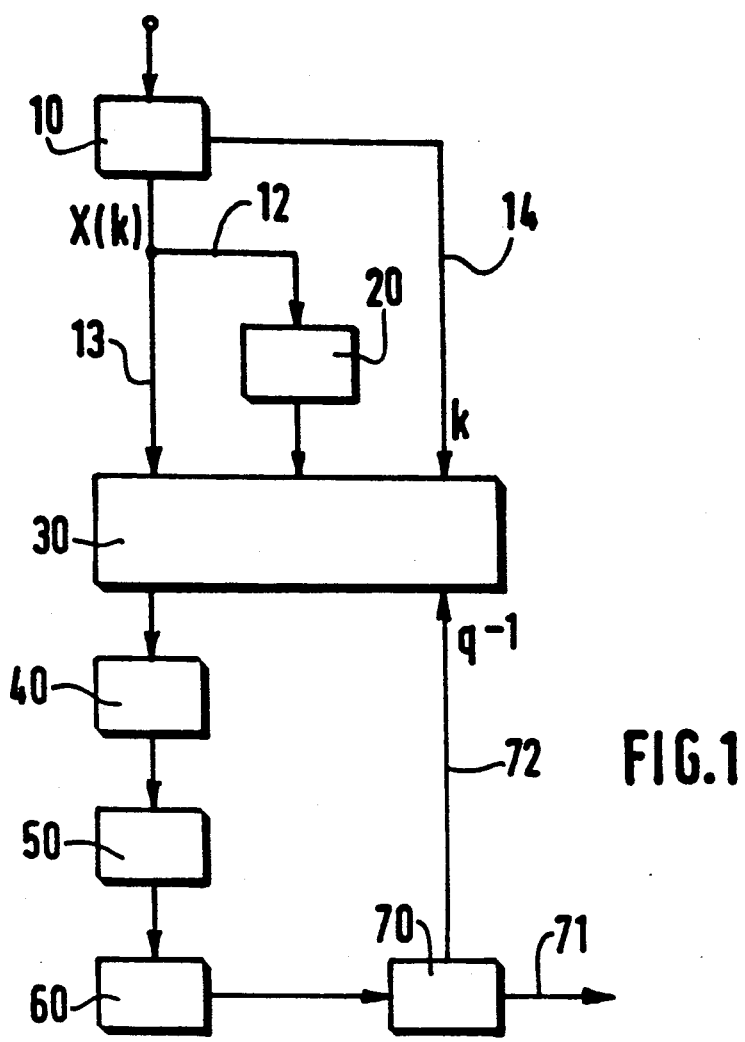
FIG. 1 shows an embodiment of the encoding device according to the invention.
Figure 2A:
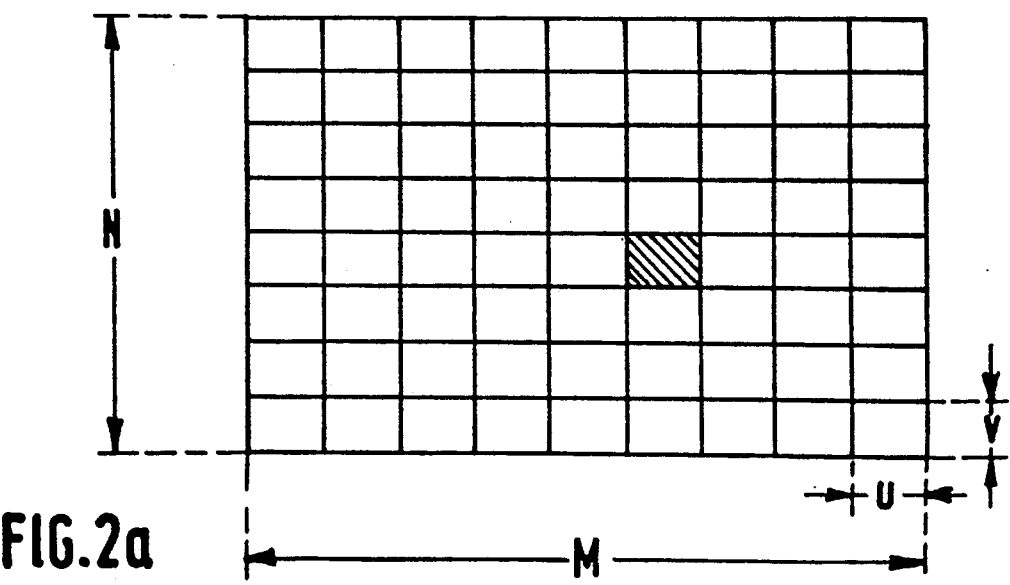
FIG. 2a shows a picture divided into N×M blocks.

In the embodiment shown in FIG. 1, the encoding device according to the invention comprises a correlation reduction circuit 10 by way of orthogonal transform, for example, a discrete cosine transform circuit. This circuit 10 receives a series of digital signals representing, in the form of a matrix of values, the luminance or chrominance of a certain number of pixels of a picture divided into blocks. The circuit 10 supplies for each block a bidimensional series of coefficients $X(k)$, where k is the row of said coefficients when they are read. FIG. 2a shows such a picture divided into M×N blocks. Such transform circuits are well known, particularly from U.S. Pat. No. 4,394,774 and the expression for the transform coefficients obtained successively for each block will not be given here. It will be readily noted that numerous statistical measurements have shown the strongest correlation between neighboring pixels of a frame or a picture and that the object of orthogonal transform is to obtain an assembly of coefficients which are more independent than the values which are available before transform.

Figure 2D:
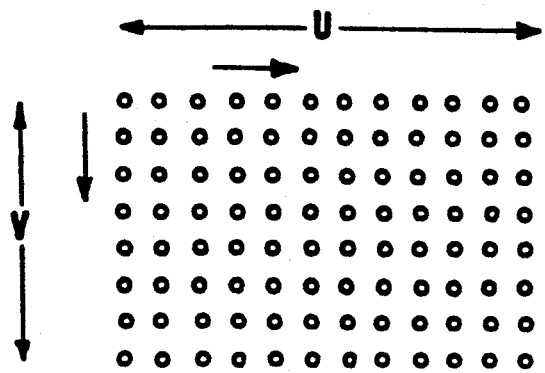
FIG. 2d shows another type of path for a block of 32 pixels.
Figure 2D:
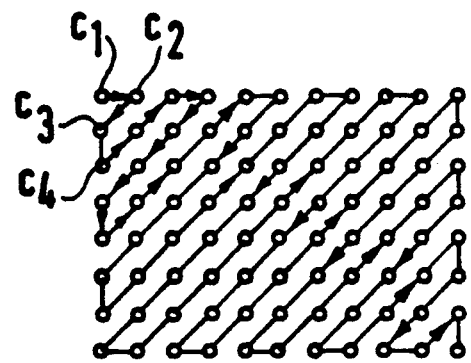
Figure 2D:
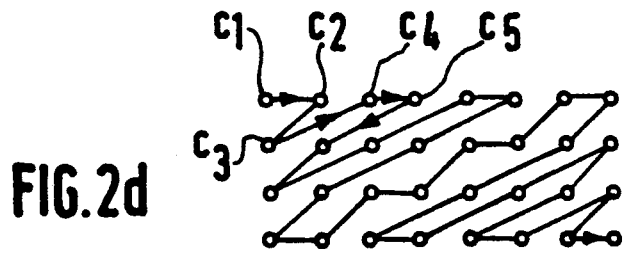
Figure 2E:
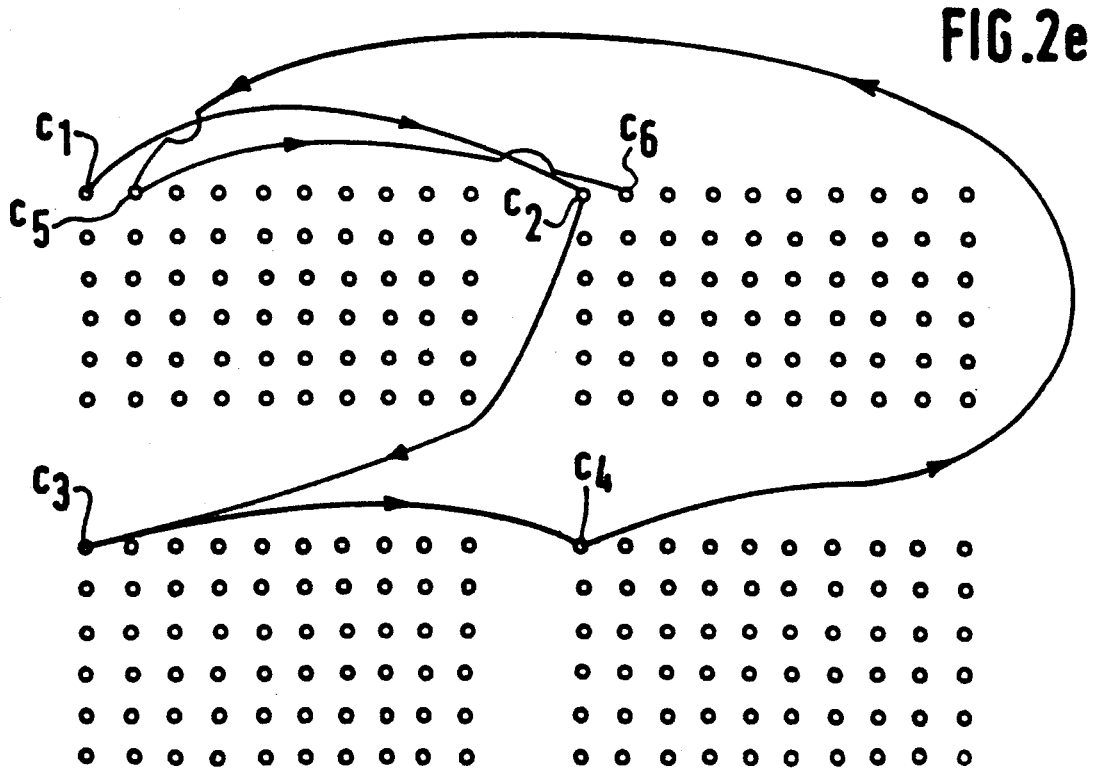
FIG. 2e shows a modification, with respect to FIG. 2c, of the path in which the coefficients are successively read in different blocks.
Figure 3C:
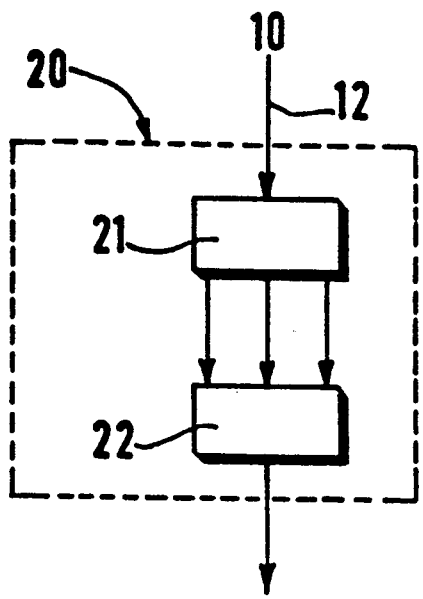
FIGS. 3a and 3b show a diagram and an organogram for better understanding of the operation of the circuit of FIG. 3c, which latter Figure shows an embodiment of the classification circuit of the encoding device of FIG. 1.
Figure 4B:
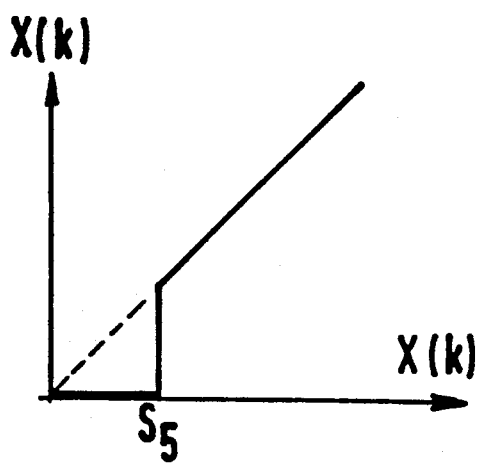
FIG. 4a shows an embodiment of the normalization circuit of the encoding device of FIG. 1, and FIGS. 4b to 4d show curves to illustrate the operation of the three circuits for non-linear treatment of this normalization circuit.
Figure 4C:
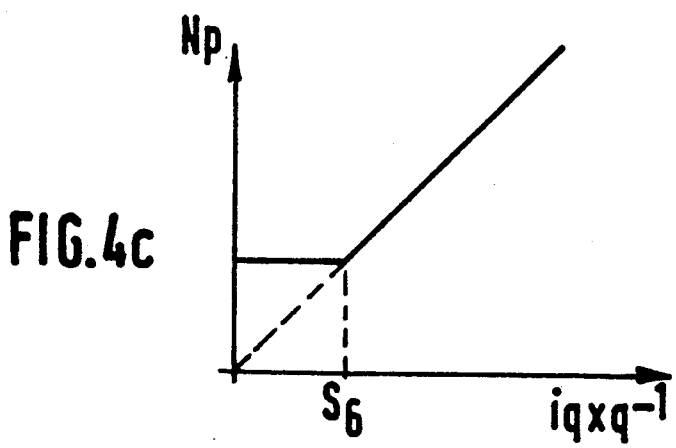

The values $X(k)$ are supplied, on the one hand, to a classification circuit 20 by means of a connection 12 and, on the other hand, to a normalization circuit 30 by means of a connection 13. These circuits 20 and 30 are shown in FIGS. 3c and 4a, respectively, and will hereinafter be described in greater detail. The normalization circuit 30 is followed by a scanning conversion circuit 40 intended to convert the series of normalized coefficients $X(k)$ into a monodimensional series. For a block such as that shown in FIG. 2b which corresponds to the hatched block in FIG. 2a, this monodimensional series may be, for example, a series in a zigzag configuration as in FIG. 2c showing, in a representation of the bidimensional matrix of transform coefficients of the picture block, a type of path defining the order of reading ($c_1$, $c_2$, $c_3$, ... etc. ... ) and of treating these coefficients. This type of path has the advantage that it permits, after performing the subsequent quantization, of having long ranges of zero values before encoding, which contributes to a reduction of the quantity of information components to be transmitted. This monodimensional series could be constituted on the basis of another criterion, for example in accordance with the type of path shown in FIG. 2d for a block of $u \times v = 32$ pixels, or it could be of another type than the path types shown, for example, determined in an adaptive way as a function of the characteristics measured on the signal itself. It is also possible to read the coefficients in different blocks, for example, a successive reading operation in each of the four neighboring spatial blocks of FIG. 2e by reading the coefficients $c_1$, $c_2$, $c_3$, $c_4$ and subsequently the coefficients $c_5$, $c_6$, etc. ... and so forth for the adopted type of path.

The scanning conversion circuit 40 is followed by a quantization circuit 50. As is known, the quantization operation is intended to convert the normalized value of each coefficient expressed with a floating point into an integral value, either by simple rounding off or preferably by truncation by taking the integral part of the value before quantization. It is clear that, if subjected to such a quantization, a certain number of values between 0 and 1 is replaced by the value 0 which reduces the number of significant coefficients to be transmitted which thus tends towards compressing the data searched. Such a quantization circuit is known and will not be further described.

As stated above, it will be readily noted that the quantization may be linear or, in contrast, of variable length. In the case of a variable length quantization the circuit 50 exactly realizes the operation described hereinbefore. If, on the other hand, the quantization is linear, the presence of a compression circuit in the circuit 50 provides the possibility of roughly reconstituting a variable length transform. This compression is justified by the fact that the essential visual information components of a picture correspond to the lowest spatial frequencies which themselves correspond to the first coefficients of the bidimensional matrix of transform coefficients.

Without the quantization necessarily having to be adaptive, it is, inter alia, important to note, as stated in greater detail hereinafter, that such an adaptive character is advantageous. It provides the possibility of modifying the quantization step in accordance with the more or less uniform nature of the picture or picture blocks and also influences the encoding, while a more rudimentary quantization involves the use of shorter code words and thus a reduction of the rate.

The output of the quantization circuit 50 is applied to an encoding circuit 60 comprising in this case tables of values encoded in accordance with a Huffman code, for the encoding of coefficient values (variable length encoding) or run lengths (run length encoding). The output of the encoding circuit 60 is connected to the input of a rate control circuit 70 which receives the values thus encoded in accordance with a variable rate and restores them at a first output 71 with a constant rate. This principal output 71 constitutes the output of the encoding device according to the invention. A rate control signal $q^{-1}$, or quality factor, is present at a second output 72 of the circuit 70. This second output 72 connects the rate control circuit 70 to the normalization circuit 30 in order to constitute the feedback loop which effectively permits of the rate control.

The circuits 20 and 30 will now be described in greater detail. Firstly, the classification circuit 20 operates in accordance with the basic circuit diagram shown in FIG. 3a, which is completed by the organogram of FIG. 3b and which is realized, for example as shown in FIG. 3c.

The classification parameters which have been taken into account for each block are the following:

(a) $N_c$, the number of non-zero coefficients in each block at the output of the orthogonal transform circuit 10;

(b) $e_m$, the average energy without the d.c. component, which energy is defined by the relation $e_m = (1/N_c) \cdot \Sigma (X(k))^2$ with k being different from 0 and $X(k)$ representing the series of coefficients after said orthogonal transform;

(c) $e_{bf}$, the percentage of low frequency energy which, if only 14 coefficients for a block of $8 \times 8$ pixels are retained, is equal to, for example $e_{bf} = \Sigma(X(i))^2 (i = 1$ to $14)/\Sigma(X(i))^2 (= 1$ to 63), the first coefficient being systematically excluded from such a calculation because it represents the d.c. component.

As is shown in FIG. 3a, the parameters thus defined are compared with thresholds in comparators COMP and a classification realized in the element CLASSIF is effected in accordance with the results of the comparisons. The organogram of comparisons, shown in FIG. 3b, may be detailed as follows, the letters Y and N indicating (in FIG. 3b) the responses YES and NO to the following test:

(A) the average energy $e_m$ is compared with a first threshold $S_1(e_m)$:

($a_1$) if $e_m$ is higher than $S_1(e_m)$, a second comparison is carried out of the percentage $e_{bf}$ with a second threshold $S_2(e_{bf})$:

($a_{11}$) if $e_{bf}$ is higher than $S_2(e_{bf})$, the picture block is classified in a first family $C_1$;

($a_{12}$) if $e_{bf}$ is less than or equal to $S_2(e_{bf})$, the picture block is classified in a second family $C_2$;

($a_2$) if $e_m$ is less than or equal to $S_1(e_m)$, a third cmparison is carried out of the number of non-zero coefficients with a third threshold $S_3(N_c)$, which comparison is designated (B);

(B) the number $N_c$ is compared with the third threshold $S_3(N_c)$:

($b_1$) if $N_c$ is less than $S_3(N_c)$, the picture block is classified in a third family $C_3$;

($b_2$) if $N_c$ is higher than or equal to $S_3(N_c)$, a fourth comparison is carried out of the percentage $e_{bf}$ with the second threshold $S_2(e_{bf})$ (it is evident that since this comparison has already been effected hereinbefore under ($a_1$) it is not repeated but its result is simply preserved for deducing the appropriate consequence in the course of this phase ($b_2$):

($b_{21}$) if $e_{bf}$ is higher than $S_2(e_{bf})$, the picture block is classified in a fourth family $C_4$ which is actually equivalent to the family $C_2$ in the example described hereinafter;

($b_{22}$) if $e_{bf}$ is less than or equal to $S_2(e_{bf})$, a fifth comparison is carried out of the number $N_c$ with a fourth threshold $S_4(N_c)$, which comparison is designated (C);

(C) the number $N_c$ is compared with the fourth threshold $S_4(N_c)$:

($c_1$) if $N_c$ is higher than $S_4(N_c)$, the picture block is classified in a fifth family $C_5$;

($c_2$) if $N_c$ is less than or equal to $S_4(N_c)$, the picture block is classified in a sixth family $C_6$.

By means of the tests which will now be described, a discrimination is obtained of the picture blocks as to whether they belong to the one or the other of the families $C_1$ to $C_6$ and thus to the corresponding distinct picture zones with a view to adapting the encoding to this classification. The values $N_c$, $e_m$, $e_{bf}$ are chosen for their discriminative power. The thresholds $S_1(e_m)$, $S_2(e_{bf})$, $S_3(N_c)$, $S_4(N_c)$ are chosen to determine the block type in a large number of sequences: family $C_1$ of blocks with a majority of contours, family $C_3$ of quasi-uniform blocks, family $C_5$ of fine texture blocks, family $C_6$ of coarse texture blocks, families $C_2$ and $C_4$ regrouping all the blocks which do not belong to the four others in a sole effective family. In the embodiment described, the following set of threshold values is used: $S_1(e_m)=50$, $S_2(e_{bf})=0.7$, $S_3(N_c)=30$ and $S_4(N_c)=50$.

For carrying out such operations, the classification circuit 20, as shown in the embodiment of FIG. 3c, comprises, on the one hand, a calculation circuit 21 which receives the coefficients X(k) from the output of the orthogonal transform circuit 10 and supplies the three parameters $N_c$, $e_m$, $e_{bf}$, and, on the other hand, a comparison and decision circuit 22 which receives these three parameters and supplies the information relating to the family $C_1$ to $C_6$ to which the current block corresponds in accordance with the organogram shown in FIG. 3b.

According to the invention, the normalization circuit 30 comprises, on the one hand, means for non-linear treatment and, on the other hand, means for normalization determining the normalized signals from the signals thus treated. These means for non-linear treatment receive the blocks and the rate control signals, as well as the classification indications of these blocks provided by the classification circuit 20, and perform non-linear treatments on these blocks and rate control signals in conformity with these indications.

In the embodiment of FIG. 4a the circuit 30 more particularly comprises a first circuit 31 for non-linear treatment of the coefficients X(k). This circuit 31 receives, on the one hand, the coefficients X(k) at the output of the orthogonal transform circuit 10 and, on the other hand, a threshold value $S_5$ provided by a memory 32. This memory 32 comprises different threshold values to be selected in accordance with the row k of the considered coefficient X(k) and in accordance with the family of the picture block, the row k being also supplied (connection 14) by the circuit 10 and the family of the block being present at the output connection of the comparison and decision circuit 22 and of the classification circuit 20 and thus being equal to one of the families $C_1$ to $C_6$. The output of the circuit 31 is either the coefficient X(k), if this coefficient is higher than or equal to the threshold, or the value 0 if the coefficient is smaller than the threshold as is indicated in the curve of FIG. 4b.

The row k and the family $C_i$ of the picture block (i=1 to 6) are also each supplied to a second memory 33 arranged in parallel with the memory 32. Only the row k is supplied to a third memory 34 and only the family $C_i$ is supplied to a fourth memory 35. As a function of the family $C_i$ of the block, this memory 35 supplies a quality indication $i_q$ which is multiplied in a multiplier 36 by the rate control signal $q^{-1}$ which is present at the connection 72 of the output of the rate control circuit 70, and the product $i_q \times q^{-1}$ thus formed is supplied in parallel to the second and third circuits 37a and 37b for non-linear treatment.

The second circuit 37a for non-linear treatment receives on the one hand, said value $i_q \times q^{-1}$ and, on the other hand, a threshold value $S_6$ which is supplied by the memory 34, and it supplies an output signal which has either a value proportional to that of the product $i_q \times q^{-1}$ if this value is higher than or equal to threshold $S_6$, or the value 1 in the opposite case. As indicated in the corresponding FIG. 4c, this means that the output of the circuit 37a, i.e. the norm proposed by the circuit, referred to as $N_p$, is locked at the value 1 until the relatively weak quality values or, which is equivalent, until relatively high values of $q^{-1}$.

Figure 4D:
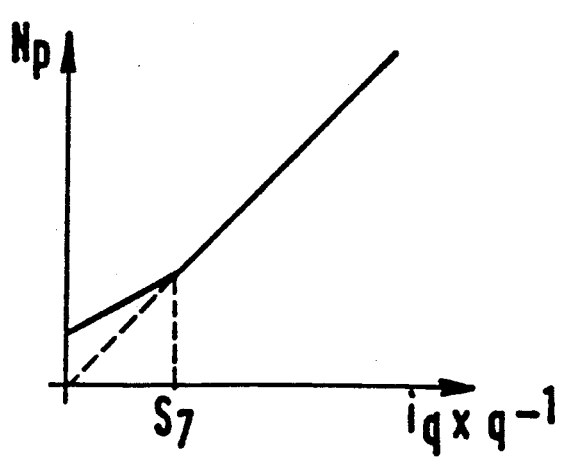
Figure 4A:
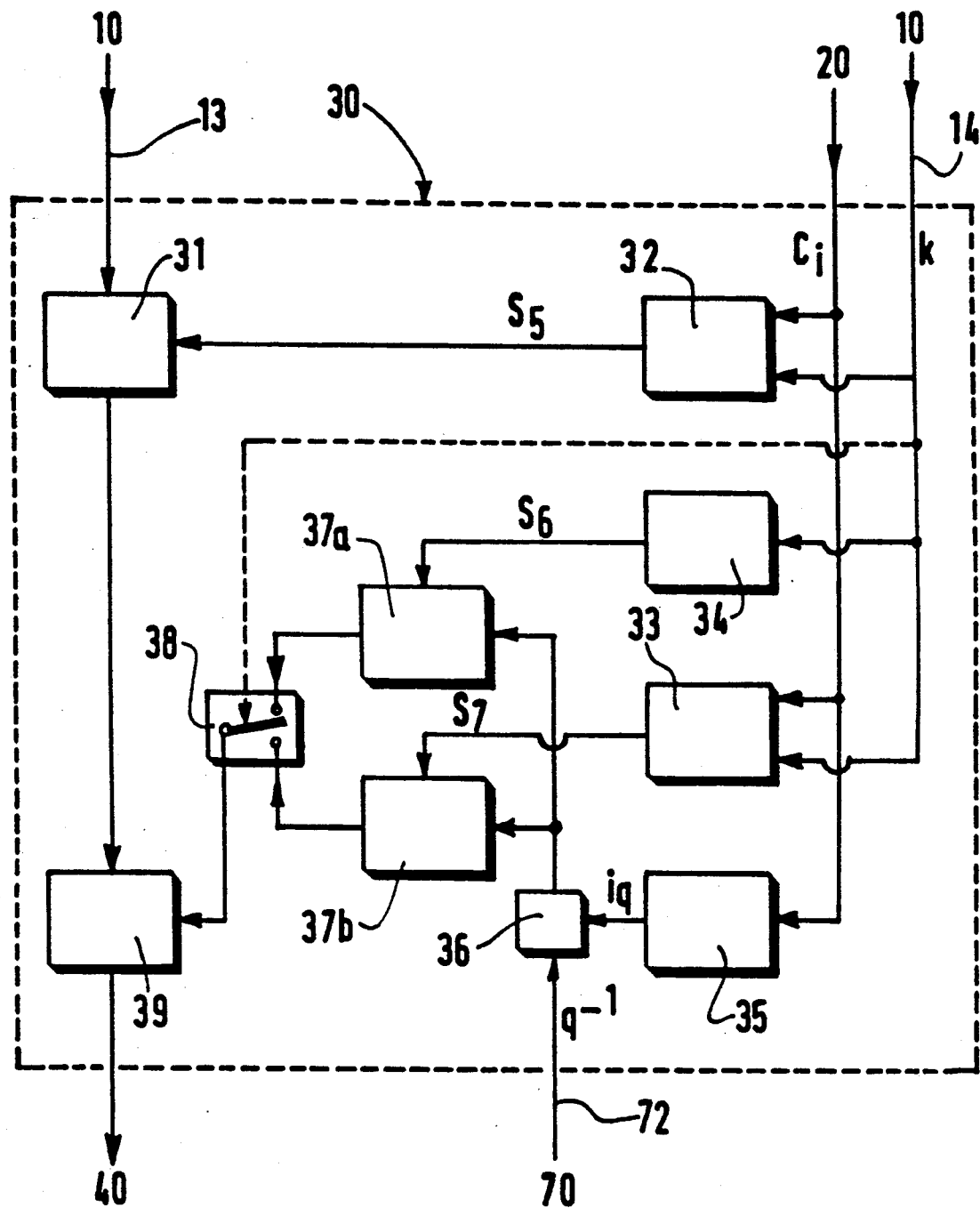

The third circuit 37b for non-linear treatment receives, on the one hand, also said value $i_q \times q^{-1}$ and, on the other hand, a threshold value $S_7$ which is supplied by the memory 33, and it supplies an output signal which, in accordance with the same principle as described hereinbefore, has either the value of the product $i_q \times q^{-1}$ if this value is higher than the threshold $S_7$ or, in the opposite case, this value is increased by a variable parameter which increases as the quality increases, i.e. when $q^{-1}$ is smaller (see the corresponding FIG. 4d, which actually shows that the effect of the proposed norm $N_p$ at the output of the circuit 37b is different from the threshold $S_7$ while the quantization step varies more rapidly above the threshold).

The different parameters accociated with the non-linear characteristics of FIGS. 4b to 4d have been determined statistically. For example, $S_5(k,C_i)$ has been calculated by analyzing the histogram of the values taken by the coefficients of the row k of the blocks of family $C_i$. The threshold $S_7(k, C_i)$ is equal to the average value of the coefficients of the row k associated with the family $C_i$ and the threshold $S_6(k)$ is chosen empirically.

The outputs of the second and third circuits 37a and 37b for non-linear treatment constitute the two input signals of a switch 38 which selects the one or the other as a norm in accordance with the family $C_i$ which corresponds to the block considered and which is suplied by the classification circuit 20. The norm, which is present at the output of the switch 38, is applied to the second input of a divider 39 whose first input receives the coefficients X(k) from the output of the orthogonal transform circuit 10. The divider 39 thus supplies the normalized coefficient values which are supplied in a monodimensional series to the scanning conversion circuit 40.

We claim:

1. A device for encoding digital video signals which are representative of the luminance or the chrominance of a given number of pixels of a picture divided into blocks, said encoding device comprising a correlation reduction circuit having an input for receiving said digital video signals, a normalization circuit having a first input coupled to an output of said correlation reduction circuit, a quantization circuit coupled to an output of said normalization circuit, an encoding circuit coupled to an output of said quantization circuit, and a rate control circuit coupled to an output of said encoding circuit for receiving output signals from the encoding circuit in accordance with a variable rate, said rate control circuit having a first output coupled to a second input of said normalization circuit for supplying rate control signals to said normalization circuit, and a second output for supplying encoded signals at a constant rate, said second output of said rate control circuit forming the output of said encoding device, characterized in that said encoding device further comprises a classification circuit for classifying said blocks into distinct families in accordance with the values of different parameters determined from these blocks, said classification circuit having an input coupled to said output of said correlation reduction circuit and an output coupled to a third input of said normalization circuit, and said normalization circuit comprises:

(A) means for non-linear treatment for receiving said blocks of signals from said correlation reduction circuit, said rate control signals from said rate control circuit, and indications of the classification of said blocks from said classification circuit, and for effecting respective distinct non-linear treatments on said blocks of signals and said rate control signals in conformity with said families; and (B) normalization means for determining the normalized signals from various signals thus treated.

2. A device as claimed in claim 1, in which the classification circuit comprises calculating means for determining an average energy $e_m$ without a d.c. component associated with the output signals of the correlation reduction circuit, characterized in that said classification circuit also comprises:

(A) means for calculating the following parameters:
 (a) the number $N_c$ of the non-zero signals at the output of said correlation reduction circuit;
 (b) the low-frequency energy percentage $e_{bf}$ without a d.c. component associated with these signals;

(B) comparison and decision means for comparing with thresholds the values taken by said parameters for each picture block and for deciding the classification of the picture blocks in different families in accordance with said parameter values.

3. A device as claimed in claim 2, characterized in that the comparisons and decisions effected by said comparison and decision means are realized in accordance with the following process:

(A) the average energy $e_m$ is compared with a first threshold $S_1(e_m)$:
 ($a_1$) if $e_m$ is higher than $S_1(e_m)$, a second comparison of the percentage $e_{bf}$ with a second threshold $S_2(e_{bf})$ is carried out;
 ($a_{11}$) if $e_{bf}$ is higher than $S_2(e_{bf})$, the picture block is classified in a first family $C_1$;

($a_{12}$) if $e_{bf}$ is less than or equal to $S_2(e_{bf})$, the picture block is classified in a second family $C_2$;
 ($a_2$) if $e_m$ is less than or equal to $S_1(e_m)$, a third comparison of the number of non-zero coefficients with a third threshold $S_3(N_c)$ is carried out, which comparison is designated (B);

(B) the number $N_c$ is compared with the third threshold $S_3(N_c)$:
 ($b_1$) if $N_c$ is less than $S_3(N_c)$, the picture block is classified in a third family $C_3$;
 ($b_2$) if $N_c$ is higher than or equal to $S_3(N_c)$, a fourth comparison of the percentage $e_{bf}$ with the second threshold $S_2(e_{bf})$ is carried out;
 ($b_{21}$) if $e_{bf}$ is higher than $S_2(e_{bf})$, the picture block is classified in a fourth family $C_4$;
 ($b_{22}$) if $e_{bf}$ is less than or equal to $S_2(e_{bf})$ a fifth comparison of the number $N_c$ with a fourth threshold $S_4(N_c)$ is carried out, which comparison is designated (C); and (C) the number $N_c$ is compared with the fourth threshold $S_4(N_c)$:
 ($c_1$) if $N_c$ is higher than $S_4(N_c)$, the picture block is classified in a fifth family $C_5$;
 ($c_2$) if $N_c$ is less than or equal to $S_4(N_c)$, the picture block is classified in a sixth family $C_6$.

4. A device as claimed in any one of claims 2 and 3, characterized in that the normalization circuit comprises:

(A) a first circuit for non-linear treatment of the output signals of the correlation reduction circuit for eliminating those signals which are smaller than a given threshold $S_5$ which is related to the row and with the family of the block of signals concerned;

(B) a multiplier for supplying the product of the rate control signals by a quality indication $i_q$ related to the family of the block of signals;

(C) a second circuit for non-linear treatment of said product for substituting a given fixed value for those product values which are smaller than a given threshold $S_6$ which is related to the row of the block of signals;

(D) a third circuit for non-linear treatment of said product for adding to said product a variable parameter value increasing as said product value is smaller, when its value is smaller than a given threshold $S_7$ which is related to the row and the family of the block of signals;

(E) a switch or selecting the output signal of one or the other of said second and third circuits for non-linear treatment in accordance with the family of the block of signals; and (F) a divider for dividing the output signal of the first circuit for non-linear treatment by the output signal of said switch, said divider supplying said normalized signals.

5. A device as claimed in claim 4, characterized in that said first, second and third circuits for non-linear treatment and the multiplier are controlled by memories which receive the row and/or the family of the block of signals concerned.

* * * * *